United States Patent Office 2,831,819
Patented Apr. 22, 1958

2,831,819

PROCESS OF PREPARING ANHYDROUS CATALYSTS PROMOTING THE MANUFACTURE OF VINYL ESTERS IN THE VAPOUR PHASE

Ernst-Walter Schmidt, Frankfurt am Main, Germany, assignor to Farbwerke Hoechst Aktiengesellschaft, vormals Meister Lucius & Brüning, Frankfurt, Germany, a German company No Drawing. Application December 16, 1953
Serial No. 398,648

Claims priority, application Germany December 24, 1952

8 Claims. (Cl. 252—428)

It is known that zinc- or cadmium salts in aqueous solution can be applied to porous carriers such as active carbon, activated aluminum oxide or silicagel and that they can be used in this form as catalysts for the thermal preparation of vinyl esters. But as the presence of even a small amount of water in the catalysts causes interfering side reactions, it is necessary to remove from the catalyst by drying the water which was required to dissolve the metallic salts and the water of crystallization which the metallic salts retain with great tenacity. This is effected by drying the soaked carrier under reduced pressure, or, in order to prevent the disadvantages of this method, by treating in the reaction vessel the superficially dried carriers with a warm current of gas and by withdrawing the last traces of water with the aid of the vapour of a reaction component which is capable of being condensed. Obviously, this method requires interrupting a continuous process of working.

I have found that the use of aqueous solutions of metallic salts and the consequently necessary process of carefully drying the catalysts can be avoided by using for their preparation not metallic salts, but metallic powders such as zinc- or cadmium powder, or a mixture thereof, finely dispersing these powders in a granular or powdered surface active carrier and transforming the metallic part of this mixture into anhydrous carboxylic acid salts by reacting it with practically anhydrous vapours of carboxylic acids. As carboxylic acids which may be used for the manufacture of these salts there may be mentioned: acetic acid, propionic acid, butyric acid, hydroxy butyric acid and benzoic acid. In general, the carboxylic acid must contain at least 2 and not more than about 8 to about 10 carbon atoms. The transformation of the metallic powders into the corresponding salts takes place in a stoichiometrical proportion.

The salts may be prepared before the production of the particular vinyl esters in a separate reaction vessel, or they may be produced in the reaction vessel destined for the preparation of the vinyl esters before or during the preparation of these esters.

The last mentioned process of preparing the vinyl ester catalysts of this invention can be applied with a special advantage to the so called fluid catalyst process during which powdered contact masses are kept in turbulent motion by a current which is caused by the participants of the reaction.

The new process has the advantage that the replacement of used up catalytic material no longer requires a catalyst which has to be made ready for use by laborious methods before producing the vinyl esters, since the mixture of carrier and, for example, powdered zinc or cadmium can be introduced directly into the reaction chamber fed with carboxylic acid vapours and acetylene. Thus, fresh anhydrous catalyst is continuously formed without any interruption of operations.

The reactivity of the metals and their salts can be increased by activating the metal, for example by slight amalgamation. Amalgamation with mercury or its salts is carried out in such a manner that about 1 to about 20 percent and advantageously about 2 to about 10 percent of mercury are taken up by the metal used for the preparation of the catalyst according to the invention.

Salt formation may take place in a current of an inert gas (for example, in a current of $CO_2$, $H_2$, or $N_2$) which carries away the hydrogen formed during the reaction, or it may take place in the course of the continuous preparation of the vinyl esters (see above).

The temperatures at which the catalysts are prepared lie in the range from about 90° C. to about 180° C. and advantageously between about 120° C. and about 130° C.

The portion of metals in the catalysts (metallic salt + carrier) prepared according to the invention, ranges from about 3 to about 35 percent, advantageously between about 5 and about 20 percent. As carriers there may be used for example, activated aluminium oxide, silica gel and active carbon.

Moreover, a catalyst prepared in the described manner, for example zinc propionate or cadmium propionate, can also be used for the preparation of vinyl acetate for example, since the catalyst is transformed into zinc acetate or cadmium acetate owing to its being continuously exposed to acetic acid vapours during the process.

The same holds true for the preparation of other esters, but it is not possible to prepare the zinc- or cadmium salts of formic acid according to the process described above, as formic acid decomposes during this reaction.

The advantages of this new process of preparing anhydrous catalysts promoting the manufacture of vinyl esters in the vapour phase lie in the especially economical, labour and time saving method of their preparation, in the possibility of their preparation in a continuous process, in their availability immediately after being prepared and in the possibility of their production even during the preparation of the esters:

It could not be foreseen that the anhydrous metallic salts formed on the surface of the porous carrier by this process would have such a good efficiency which is still increased in the course of its use.

The following examples illustrate the invention, but they are not intended to limit it thereto:

*Example 1*

200 grams of finely ground activated peat charcoal are intimately mixed with 40 grams of purest zinc dust and introduced into a vertical glass tube of 40 mm. diameter and 800 mm. height provided below with a glass frit which serves as inlet for the gases streaming through the tube. The reaction tube is built into a furnace which is heated to 120° C. and a current of dry nitrogen, carrying acetic acid vapours is passed from below through the carbon-zinc mixture. The current is of such quality that it causes only a loosening of the layer of the contact mass, not yet a turbulence. The proceeding transformation of the metal into the acetate can be followed by regulating the temperature in the layer. At the end of the transformation the temperature is increased to the reaction temperature and now acetylene is blown in instead of nitrogen carrying acetic acid vapours. A turbulent movement of the contact masses takes place which are kept at a temperature from about 180° C. to about 200° C. The gases and vapours which leave the reaction tube are separated in a known manner, the excess of acetylene is conveyed back again into circulation. The catalytic material which has been carried away is separated and continuously brought back again into the reaction tube, losses which occur in form of dust are replaced by small additions of the above mentioned mixture of active carbon and zinc dust which is transformed during the process into an efficient catalyst. In the initial stages, the reaction mixture yields only about 50 percent of vinyl acetate, but owing to the increased efficiency of the catalyst in the course of its use, soon a content of vinyl acetate amounting to about 80 to about 85 percent is obtained in the mixture.

*Example 2*

40 grams of purest zinc dust are shaken with an aqueous solution containing 2 grams of mercuric acetate, the amalgamated zinc dust is skimmed off, washed several times with water and finally dried under reduced pressure. This powder is then intimately mixed with 200 grams of finely ground activated peat charcoal and this mixture is treated as described in Example 1 in a ntirogen current carrying acetic acid vapours until the transformation of the activated metal into the acetate is complete. When on further heating, a contact temperature of about 180° C. is reached, the nitrogen is displaced by acetylene with simultaneous evaporation of 20 cc. of acetic acid per hour. The contact temperature increases to about 185° C.–about 195° C. and is maintained at this level. After 5 hours of reaction, 118 grams of a reaction product separate, containing 64.3 percent of vinyl acetate. 107 grams of the contact powder which has been carried along and is separated is introduced again into the reaction tube together with 10 grams of the above mentioned mixture of amalgamated zinc and active peat charcoal and are further treated with the reaction mixture consisting of acetylene and acetic acid at a temperature between about 185–about 195° C. This time, the content of vinyl acetate amounts to 70.1 percent of the reaction product and will further increase to 83.5 percent if the charging of the reaction tube and the passage of the gases through the tube are repeated.

*Example 3*

200 grams of zinc dust and 200 grams of powdered cadmium are finely dispersed in 4 kilograms of ground active carbon. In a vertical reaction tube of 10 cm. diameter and 1 m. height and surrounded by a jacket which can be heated are exposed 3 liters of this powder to acetic acid vapours in a nitrogen current as described before. When the formation of the acetate has ceased, acetylene is blown in by means of a blower, setting the catalyst into a turbulent movement. Together with the acetylene, 200 grams of acetic acid vapour are admitted per hour. The catalytic powder carried along by the reaction vapours is deposited in two successive separators and is reconveyed into the reaction tower. Since a small amount of the catalyst is hereby lost, a corresponding amount of the above mixture consisting of zinc-cadmium charcoal is continuously added. About 50–about 80 percent of the acetic acid are changed into vinyl acetate during the first passage through the furnace.

I claim:

1. In the process of preparing anhydrous catalysts promoting the manufacture of vinyl esters from acetylene and carboxylic acids selected from the group consisting of acetic acid, propionic acid, butyric acid, hydroxybutyric acid and benzoic acid in the vapour phase, the step which comprises heating a mixture of a powdered amalgam of a metal of the second transition period selected from the group consisting of zinc and cadmium and mixtures thereof, with a surface-active finely dispersed carrier in the presence of the vapour of one of the above mentioned carboxylic acids at temperatures of about 90° C. to about 180° C., the amount of said metal of a second transition period ranging between about 3 and about 35 percent calculated on the weight of the catalyst, and the amount of mercury in said amalgam ranging between about 1 and about 20 percent calculated on the weight of said metal of the second transition period.

2. In the process of preparing anhydrous catalysts promoting the manufacture of vinyl esters from acetylene and carboxylic acids selected from the group consisting of acetic acid, propionic acid, butyric acid, hydroxybutyric acid and benzoic acid in the vapour phase, the step which comprises heating a mixture of a powdered amalgam of a metal of the second transition period selected from the group consisting of zinc and cadmium and mixtures thereof, with a surface-active finely dispersed carrier in the presence of the vapour of one of the above mentioned carboxylic acids at temperatures of about 120° C. to about 130° C., the amount of said metal of a second transition period ranging between about 3 and about 35 percent calculated on the weight of the catalyst, and the amount of mercury in said amalgam ranging between about 1 and about 20 percent calculated on the weight of said metal of the second transition period.

3. In the process of preparing anhydrous catalysts promoting the manufacture of vinyl acetate from acetylene and acetic acid in the vapour phase, the step which comprises heating a mixture of a powdered amalgam of a metal of the second transition period selected from the group consisting of zinc and cadmium and mixtures thereof, with a surface-active finely dispersed carrier in the presence of acetic acid vapour at temperatures of about 90° C. to about 180° C., the amount of said metal of a second transition period ranging between about 3 and about 35 percent calculated on the weight of the catalyst, and the amount of mercury in said amalgam ranging between about 1 and about 20 percent calculated on the weight of said metal of the second transition period.

4. In the process of preparing anhydrous catalysts promoting the manufacture of vinyl propionate from acetylene and propionic acid in the vapour phase, the step which comprises heating a mixture of a powdered amalgam of a metal of the second transition period selected from the group consisting of zinc and cadmium and mixtures thereof, with a surface-active finely dispersed carrier in the presence of propionic acid vapour at temperatures of about 90° C. to about 180° C., the amount of said metal of a second transition period ranging between about 3 and about 35 percent calculated on the weight of the catalyst, and the amount of mercury in said amalgam ranging between about 1 and about 20 percent calculated on the weight of said metal of the second transition period.

5. In the process of preparing anhydrous catalysts promoting the manufacture of vinyl butyrate from acetylene and butyric acid in the vapour phase, the step which comprises heating a mixture of a powdered amalgam of a metal of the second transition period selected from the group consisting of zinc and cadmium and mixtures thereof, with a surface-active finely dispersed carrier in the presence of butyric acid vapour at temperatures of about 90° C. to about 180° C., the amount of said metal of a second transition period ranging between about 3 and about 35 percent calculated on the weight of the catalyst, and the amount of mercury in said amalgam ranging between about 1 and about 20 percent calculated on the weight of said metal of the second transition period.

6. In the process of preparing anhydrous catalysts promoting the manufacture of vinyl benzoate from acetylene and benzoic acid in the vapour phase, the step which comprises heating a mixture of a powdered amalgam of a metal of the second transition period selected from the group consisting of zinc and cadmium and mixtures thereof, with a surface-active finely dispersed carrier in the presence of benzoic acid vapour at temperatures of about 90° C. to about 180° C., the amount of said metal of a second transition period ranging between about 3 and about 35 percent calculated on the weight of the catalyst, and the amount of mercury in said amalgam ranging between about 1 and about 20 percent calculated on the weight of said metal of the second transition period.

7. In the process of preparing anhydrous catalysts promoting the manufacture of vinyl esters from acetylene and carboxylic acids selected from the group consisting of acetic acid, propionic acid, butyric acid, hydroxybutyric acid and benzoic acid in the vapour phase, the step which comprises heating a mixture of a powdered amalgam of a metal of the second transition period selected from the group consisting of zinc and cadmium and mixtures thereof, with surface-active finely dispersed active carbon in the presence of the vapour of one of the above mentioned carboxylic acids at temperatures of about 90° C. to about 180° C., the amount of said metal of a second transition period ranging between about 3 and about 35 percent calculated on the weight of the catalyst, and the amount of mercury in said amalgam ranging between about 1 and about 20 percent calculated on the weight of said metal of the second transition period.

8. In the process of preparing anhydrous catalysts promoting the manufacture of vinyl esters from acetylene and carboxylic acids selected from the group consisting of acetic acid, propionic acid, butyric acid, hydroxybutyric acid and benzoic acid in the vapour phase, the step which comprises heating a mixture of a powdered amalgam of a metal of the second transition period selected from the group consisting of zinc and cadmium and mixtures thereof, with a surface-active finely dispersed carrier in the presence of the vapour of one of the above mentioned carboxylic acids at temperatures of about 90° C. to about 180° C., the amount of said metal of a second transition period ranging between about 5 and about 20 percent calculated on the weight of the catalyst, and the amount of mercury in said amalgam ranging between about 1 and about 20 percent calculated on the weight of said metal of the second transition period.

References Cited in the file of this patent

UNITED STATES PATENTS

| | | |
|---|---|---|
| 1,089,240 | Matignon | Mar. 3, 1914 |
| 1,555,539 | Williams | Sept. 29, 1925 |
| 1,999,573 | Odell | Apr. 30, 1935 |
| 2,374,379 | Rittmeister | Apr. 24, 1945 |
| 2,606,142 | Storch et al. | Aug. 5, 1952 |

FOREIGN PATENTS

| | | |
|---|---|---|
| 172,690 | Great Britain | July 7, 1906 |